United States Patent
Crawford et al.

(10) Patent No.: US 12,208,871 B2
(45) Date of Patent: Jan. 28, 2025

(54) SYSTEM AND METHOD FOR DETECTING PERSON OVERBOARD

(71) Applicant: Navico, Inc., Tulsa, OK (US)

(72) Inventors: Christopher D. Crawford, Bixby, OK (US); Zachary E. Vincent, Tulsa, OK (US)

(73) Assignee: NAVICO, INC., Tulsa, OK (US)

( * ) Notice: Subject to any disclaimer, the term of this patent is extended or adjusted under 35 U.S.C. 154(b) by 298 days.

(21) Appl. No.: 17/740,696

(22) Filed: May 10, 2022

(65) Prior Publication Data

US 2024/0092464 A1 Mar. 21, 2024

(51) Int. Cl.
| | |
|---|---|
| *B63C 9/00* | (2006.01) |
| *A62B 35/00* | (2006.01) |
| *B63H 21/21* | (2006.01) |
| *G05D 1/00* | (2024.01) |
| *G08B 21/08* | (2006.01) |

(52) U.S. Cl.
CPC ........ *B63C 9/0011* (2013.01); *A62B 35/0043* (2013.01); *B63C 9/0005* (2013.01); *B63H 21/213* (2013.01); *G05D 1/0016* (2013.01); *G05D 1/0206* (2013.01); *G08B 21/088* (2013.01); *B63H 2021/216* (2013.01)

(58) Field of Classification Search
None
See application file for complete search history.

(56) References Cited

U.S. PATENT DOCUMENTS

| | | | |
|---|---|---|---|
| 4,630,205 A | 12/1986 | Otaka | |
| 5,892,338 A | 4/1999 | Moore et al. | |
| 6,054,831 A | 4/2000 | Moore et al. | |
| 6,150,928 A | 11/2000 | Murray | |
| 6,273,771 B1 | 8/2001 | Buckley et al. | |
| 6,650,227 B1 | 11/2003 | Bradin | |
| 6,878,019 B2 * | 4/2005 | Kanno | B63H 25/04 114/144 A |
| 7,267,068 B2 | 9/2007 | Bradley et al. | |

(Continued)

FOREIGN PATENT DOCUMENTS

| | | |
|---|---|---|
| DE | 102015011630 A1 | 3/2017 |
| DE | 102018127664 A1 | 5/2019 |

(Continued)

OTHER PUBLICATIONS

European Search Report in corresponding EP Application No. 23172209.1, dated Oct. 9, 2023, 7 pages.

(Continued)

*Primary Examiner* — Todd Melton
(74) *Attorney, Agent, or Firm* — Andrus Intellectual Property Law, LLP

(57) ABSTRACT

A system for a marine vessel propelled by a propulsion device includes a controller operable in an automatic navigation mode in which the controller automatically controls a thrust of the propulsion device to propel the marine vessel through a body of water. A portable device is carried on an individual on the marine vessel. The controller enables a person overboard detection algorithm in response to enablement of the automatic navigation mode. The person overboard detection algorithm disables the automatic navigation mode in response to detecting a given status of the portable device.

20 Claims, 5 Drawing Sheets

(56) References Cited

U.S. PATENT DOCUMENTS

| | | |
|---|---|---|
| 7,305,928 B2 | 12/2007 | Bradley et al. |
| 7,855,654 B2 | 12/2010 | Katz |
| 9,377,780 B1 | 6/2016 | Arbuckle et al. |
| 9,988,134 B1 | 6/2018 | Gable et al. |
| 10,093,400 B2 | 10/2018 | Schot |
| 10,198,005 B2 | 2/2019 | Arbuckle et al. |
| 10,460,484 B2 | 10/2019 | Hovland et al. |
| 10,730,600 B2 | 8/2020 | Gonring |
| 10,921,802 B2 | 2/2021 | Bertrand et al. |
| 10,922,947 B2 * | 2/2021 | Watanabe ............ G08B 29/185 |
| 11,046,410 B2 | 6/2021 | Gonring |
| 11,250,653 B2 | 2/2022 | Gonring et al. |
| 11,275,371 B2 | 3/2022 | Harnett et al. |
| 11,531,341 B2 * | 12/2022 | Behrendt ............. G05D 1/0016 |
| 2007/0229252 A1 | 10/2007 | Collins et al. |
| 2018/0335780 A1 * | 11/2018 | Stevens ................ B63C 9/0011 |
| 2020/0255104 A1 | 8/2020 | Gonring et al. |
| 2022/0058957 A1 | 2/2022 | Rydstrom |
| 2022/0089259 A1 | 3/2022 | Williams et al. |
| 2022/0234701 A1 * | 7/2022 | Suda .................... G05D 1/0022 |

FOREIGN PATENT DOCUMENTS

| | | |
|---|---|---|
| FR | 2487286 A3 | 1/1982 |
| FR | 2637713 A1 | 4/1990 |
| GB | 2462414 A | 2/2010 |
| GB | 2523842 A | 9/2015 |
| GB | 2556214 A | 5/2018 |
| WO | 2003018398 A1 | 3/2003 |
| WO | 2017085664 A1 | 5/2017 |

OTHER PUBLICATIONS

Brunswick Corporation, "1st Mate Marine Safety & Security System," admitted prior art, webpage last accessed Apr. 13, 2022, available at https://www.1stmate.com/content/firstMate/US/en/home.html.

\* cited by examiner

SYSTEM AND METHOD FOR DETECTING PERSON OVERBOARD

FIELD

The present disclosure relates to control of marine vessels, and specifically to detecting that a person may have fallen overboard.

BACKGROUND

U.S. Pat. No. 5,892,338 discloses a trolling motor system comprising a trolling motor having a propeller rotatably driven thereby. The motor is connected to a rotating tube or column mounted to the boat. A control head is mounted at the upper end of the column. A steering motor in the control head controls rotational position of the trolling motor. The control head houses a control circuit for controlling speed of the trolling motor as well as position of the steering motor to steer the boat. A foot pedal is positioned in the boat in proximity to the control head. The foot pedal includes a plurality of user actuable switches for commanding operation of the steering motor and trolling motor. The commands are transmitted via radio frequency to a receiver in the control head. The receiver decodes the commands and transfers the command to the control circuit.

U.S. Pat. No. 6,273,771 discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 10,460,484 discloses a touch screen that may be utilized by a marine electronic device to easily enter a route in relation to a chart. The marine electronic device may automatically determine and join geographic points associated with the chart to generate a route based on a touch pattern. The marine electronic device may be configured to complete the route to form a route loop in instances in which the start and end of the touch pattern are within a predetermined distance. The completion of the route may be accomplished by connecting the end point to the start point or by "snapping" the end point to the start point, e.g. shifting the end point to the start point. Additionally or alternatively, a user may use pre-determined route snippets to quickly and easily alter a route.

U.S. Pat. No. 10,730,600 discloses a method of operating a wireless lanyard system on a marine vessel having at least one propulsion device including defining a permitted zone with respect to a helm area where an operator should occupy based on one or more conditions of the marine vessel. Generating a location inquiry signal by a helm transceiver at the helm area of the marine vessel, and receiving an operator location signal from an operator fob worn by the operator of the marine vessel in response to the location inquiry signal. The method further includes determining whether the operator is within the permitted zone with respect to the helm area based on the operator location signal, and generating a lanyard event when the operator is not within the permitted zone. Upon generation of the lanyard event, the propulsion device is controlled to reduce an engine RPM to an idle RPM or the propulsion device is turned off.

U.S. Pat. No. 11,275,371 discloses many different types of systems that are utilized or tasks are performed in a marine environment. The present invention provides various configurations of unmanned vehicles, or drones, that can be operated and/or controlled for such systems or tasks. One or more unmanned vehicles can be integrated with a dedicated marine electronic device of a marine vessel for autonomous control and operation. Additionally or alternatively, the unmanned vehicle can be manually remote operated during use in the marine environment. Such unmanned vehicles can be utilized in many different marine environment systems or tasks, including, for example, navigation, sonar, radar, search and rescue, video streaming, alert functionality, among many others. However, as contemplated by the present invention, the marine environment provides many unique challenges that may be accounted for with operation and control of an unmanned vehicle.

U.S. Patent Application Publication No. 2020/0255104 discloses a vessel control system for a marine vessel propelled by at least one propulsion device including a wireless lanyard system including at least one fob worn by an individual on the marine vessel and a helm transceiver at a helm area of the marine vessel configured to receive radio signals from the at least one fob. A controller is configured to detect, based on communications between each of the at least one fob and the helm transceiver, that each of the at least one fob is present on the marine vessel. A missing fob is detected if at least one of the fobs is no longer detected at the helm transceiver, and then a man overboard event is generated. The vessel control system is configured to automatically activate one or more search assistance functions based on the man overboard event.

The above patents are hereby incorporated by reference herein in their entireties.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a system for a marine vessel propelled by a propulsion device includes a controller operable in an automatic navigation mode in which the controller automatically controls a thrust of the propulsion device to propel the marine vessel through a body of water. A portable device is configured to be carried on an individual on the marine vessel. The controller enables a person overboard detection algorithm in response to enablement of the automatic navigation mode. The person overboard detection algorithm disables the automatic navigation mode in response to detecting a given status of the portable device.

In one example, a receiver is in signal communication with the controller. In such an example, the portable device comprises a transmitter and the given status of the portable device relates to a signal strength of the transmitter as received by the receiver. In one example, the person overboard detection algorithm disables the automatic navigation mode in response to detecting an abrupt change in the received signal strength of the transmitter.

In one example, the portable device further comprises an accelerometer and the person overboard detection algorithm disables the automatic navigation mode in response to an abrupt change in acceleration of the portable device as determined by the accelerometer.

In one example, the given status of the portable device is that the portable device is not physically connected to a switch in signal communication with the controller. In one example, the switch is movable onboard the marine vessel while still maintaining signal communication with the controller.

In one example, the person overboard detection algorithm controls the propulsion device to cause the marine vessel to backtrack along an immediately prior course of the marine vessel in response to detecting the given status of the portable device.

In one example, the person overboard detection algorithm controls the propulsion device to reduce the thrust thereof in response to determining that the marine vessel is within a given range of the portable device subsequent to having been outside the given range of the portable device.

In one example, the person overboard detection algorithm controls the propulsion device to stop producing thrust in response to detecting the given status of the portable device.

In one example, the portable device is a remote control configured to allow the individual to control the thrust of the propulsion device.

According to another example of the present disclosure, a method for controlling a propulsion device on a marine vessel includes enabling an automatic navigation mode in which a thrust of the propulsion device is controlled automatically to propel the marine vessel through a body of water. The method includes enabling a person overboard detection algorithm in response to enablement of the automatic navigation mode. The method also includes disabling the automatic navigation mode in response to the person overboard detection algorithm determining that an individual on the marine vessel may have fallen overboard.

In one example, the step of determining that the individual on the marine vessel may have fallen overboard comprises detecting a given status of a portable device configured to be carried on the individual and in signal communication with a controller of the propulsion device.

In one example, the given status of the portable device is that the portable device is not physically connected to a switch in signal communication with the controller. In one example, the switch is movable onboard the marine vessel while still maintaining signal communication with the controller.

In one example, the portable device comprises a transmitter and the given status of the portable device relates to a signal strength of the transmitter as received by a receiver in signal communication with the controller.

In one example, the method includes disabling the automatic navigation mode in response to detecting an abrupt change in the received signal strength of the transmitter.

In one example, the method includes disabling the automatic navigation mode in response to an abrupt change in acceleration of the portable device as determined by an accelerometer in the portable device.

In one example, the method includes controlling the propulsion device to cause the marine vessel to backtrack along an immediately prior course of the marine vessel in response to determining that the individual on the marine vessel may have fallen overboard.

In one example, the method includes reducing the thrust of the propulsion device in response to determining that the marine vessel is within a given range of the individual subsequent to having been outside the given range of the individual.

In one example, the method includes discontinuing thrust production by the propulsion device in response to determining that the individual on the marine vessel may have fallen overboard.

BRIEF DESCRIPTION OF THE DRAWINGS

The present disclosure is described with reference to the following Figures. The same numbers are used throughout the Figures to reference like features and like components.

DETAILED DESCRIPTION

Figure 1:
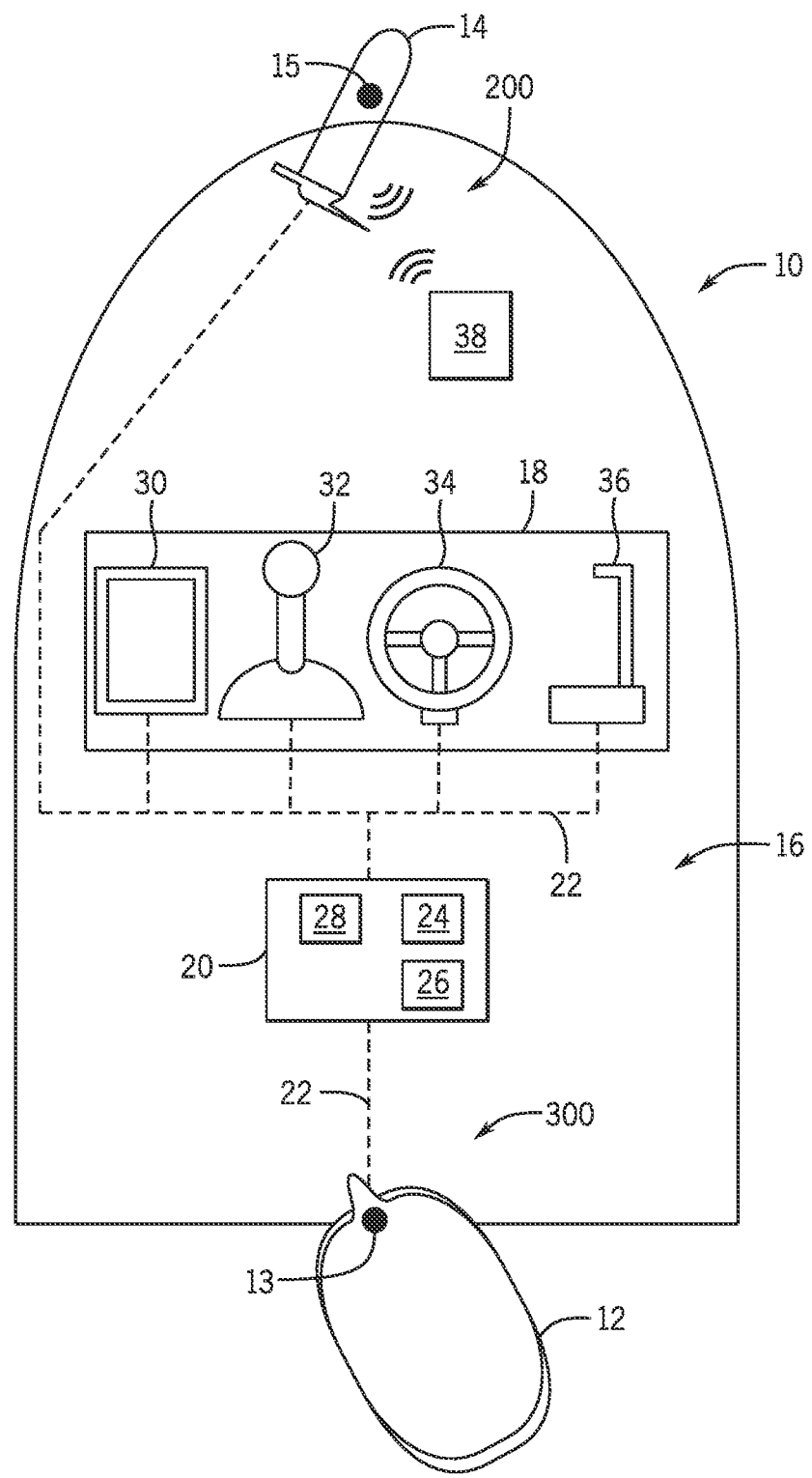
FIG. 1 illustrates a marine vessel equipped with a marine propulsion system.

FIG. 1 shows a marine vessel 10. The marine vessel 10 is capable of operating, for example, in a normal operating mode and at least one automatic navigation mode as will be described further herein below. The marine vessel 10 has a primary propulsion device 12 located at its stern and a secondary propulsion device (trolling motor assembly 14) located at its bow. As illustrated, the primary propulsion device 12 is an outboard motor; however, the primary propulsion device 12 could be any one of an inboard motor, a stern drive, a pod drive, a jet drive, a thruster, or any other marine propulsion device as appropriate for its location. Each propulsion device 12, 14 is steerable about its respective steering axis 13, 15 and produces thrust by causing rotation of its respective propeller or other propulsor, as the case may be.

The marine vessel 10 also includes various control elements that together with the propulsion devices 12, 14 make up a marine propulsion system 16. The marine propulsion system 16 comprises an operation console 18 in communication with a controller 20 via a controller area network (CAN) bus 22 as described in U.S. Pat. No. 6,273,771. The controller 20 includes a processing system 24, a storage system 26 accessible by the processing system 24, and an input/output (I/O) interface 28, which relays information to and from the processing system 24. The processing system 24 can comprise a microprocessor, including a control unit and a processing unit, and other circuitry, such as semiconductor hardware logic, that retrieves and executes software from the storage system 26. The storage system 26 can comprise any storage media readable by the processing system 24 and capable of storing software. The storage system 26 can include volatile and non-volatile, removable and non-removable media implemented in any method or technology for storage of information, such as computer-readable instructions, data structures, software modules, or other data. The processing system 24 loads and executes software from the storage system 26, such as software programmed with one or more automatic navigation algorithms and software programmed with a person overboard detection algorithm, which direct the processing system 24 to operate as described herein below in further detail. In one example, the controller 20 is (or is part of) a helm control module, a propulsion control module, or other known module for use on a marine vessel 10. Note that the controller 20 is not shown as being connected to every component in the diagrams provided herein, but the controller 20 is in fact directly or indirectly electrically and/or signally connected to each component that it is described as controlling or from which it receives information.

The operation console 18 includes a number of user input devices, such as a marine electronic device 30 (e.g., a chart plotter, a fish finder, a multi-function display, or other dedicated device), a joystick 32, a steering wheel 34, and a shift/speed lever 36. Each of these user input devices may provide a request for movement of the marine vessel 10 to the controller 20 via the I/O interface 28. The steering wheel 34 and the shift/speed lever 36 function in the conventional manner. For example, rotation of the steering wheel 34 may activate a transducer that provides a signal to the controller 20 regarding a desired movement of the marine vessel 10. The controller 20 in turn sends signals to activate steering actuators to achieve desired orientations of the primary propulsion device 12 about its respective steering axis 13 as known in the art. The shift/speed lever 36 sends signals to the controller 20 regarding the desired shift or direction of movement (forward, reverse, or neutral) and the desired magnitude of thrust for the primary propulsion device 12. The controller 20 in turn sends signals to the primary propulsion device 12 to activate actuators for shift or direction and for engine throttle or motor speed, respectively. As is known, the joystick 32 can also be used to input requests for movement to the controller 20, such as when the operator desires more controlled movement of the marine vessel 10, such as for example purely longitudinal movement, purely lateral movement, purely rotational movement, or any combination thereof, as is known in the art.

The trolling motor assembly 14 can be controlled by the controller 20 as well, in response to inputs to the joystick 32, steering wheel 34, and shift/speed lever 36, as described in U.S. Pat. No. 9,988,134, hereby incorporated by reference herein. Additionally or alternatively, the trolling motor assembly 14 can be controlled by its own controller (see 213, FIG. 2), such as one located in the head or base of the trolling motor assembly 14. In this way, the trolling motor assembly 14 can be operated independently of the inputs to the joystick 32, steering wheel 34, and shift/speed lever 36. Those having ordinary skill in the art would understand that such control could be accomplished via inputs to a user interface on the head or base of the trolling motor assembly 14 and/or via inputs to a remote control 38 dedicated to controlling the trolling motor assembly 14 and/or via inputs to a foot pedal, as will all be described herein below with respect to FIG. 2. Further, the marine electronic device 30 could also be used to provide inputs to the trolling motor controller 213 due to connection between the two provided by the CAN bus 22, as is known.

It should be recognized that other inputs may be incorporated in addition to, or instead of, those described in the above embodiment. For example, inputs may come from other physical devices or from non-human sources, such as from electronic anchoring, waypoint tracking, or heading control systems. Similarly, the control functions described in conjunction with controller 20 may be distributed across multiple controllers, such as separate controllers within the propulsion devices 12, 14 or located elsewhere on the marine vessel 10.

Figure 2:
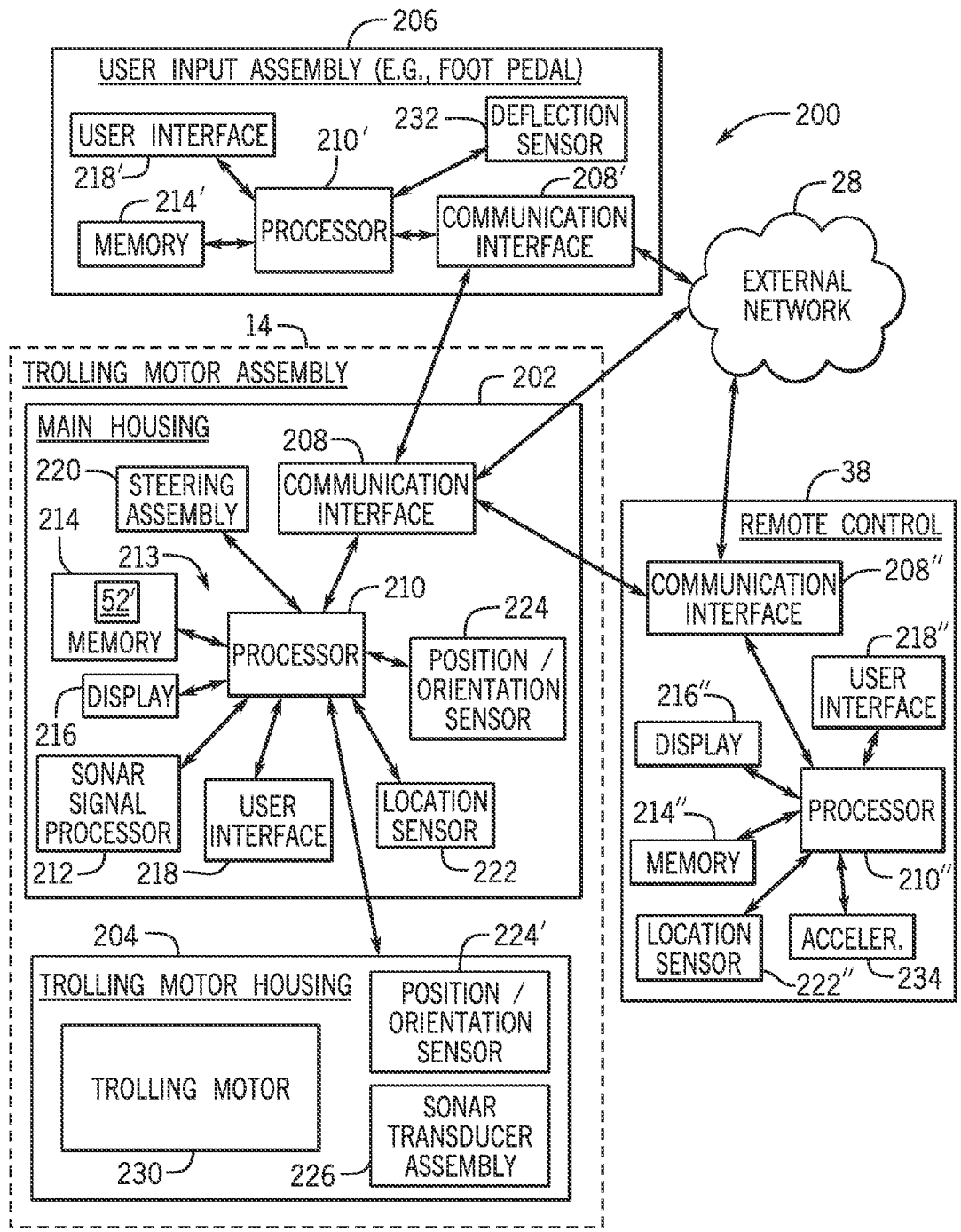
FIG. 2 is a schematic illustrating a portion of the marine propulsion system comprising a trolling motor.

FIG. 2 shows a block diagram of an example trolling motor system 200 that is part of the marine propulsion system 16 associated with the trolling motor assembly 14. As shown, the trolling motor system 200 may include a number of different modules or components, each of which may comprise any device or means embodied in either hardware, software, or a combination of hardware and software configured to perform one or more corresponding functions. For example, the trolling motor system 200 may include a trolling motor assembly 14 (that includes, for example, a main housing 202 and a trolling motor housing 204), a user input assembly 206 (e.g., a foot pedal assembly), and a remote control 38. While the user input assembly 206 and the remote control 38 are shown as being outside the trolling motor assembly 14, in some embodiments, one or more of them may be included within the trolling motor assembly 14.

The trolling motor system 200 may also include one or more communications modules configured to communicate with one another in any of a number of different manners including, for example, via a network. In this regard, the communication interface (e.g., 208, 208', 208") may include any of a number of different communication backbones or frameworks including, for example, Ethernet, the NMEA 2000 framework, GPS, cellular, WiFi, Bluetooth, Bluetooth Low Energy, Zigbee, or other suitable networks. The network may also support other data sources, including GPS, autopilot, engine/motor data, compass, radar, etc. Numerous other peripheral, remote devices such as a wired or wireless marine electronic device 30 may be connected to the trolling motor system 200.

The trolling motor assembly 14 may include a main housing 202, a trolling motor housing 204, and, in some embodiments, a shaft therebetween. Though various modules/systems are shown within one or more of the main housing 202 and/or the trolling motor housing 204, various modules/systems may be present outside of the main housing 202 or trolling motor housing 204, but still may be a part of the trolling motor assembly 14.

The main housing 202 can be the head or the base of the trolling motor assembly 14 and may include a processor 210, a sonar signal processor 212, a memory 214, a communication interface 208, a display 216, a user interface 218, a steering assembly 220, and one or more sensors (e.g., location sensor 222, a position/orientation sensor 224, etc.). Together, at least the processor 210 and memory 214 make up the trolling motor controller 213.

The processor 210 and/or the sonar signal processor 212 may be any means configured to execute various programmed operations or instructions stored in a memory device (e.g. memory 214) such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processors 210, 212 as described herein.

In this regard, the processor 210 may be configured to analyze electrical signals communicated thereto to provide display data to the display 216 or other remote display. In some example embodiments, the processor 210 or sonar signal processor 212 may be configured to receive sonar data indicative of the size, location, shape, etc. of objects detected by a sonar transducer assembly 226 located in the trolling motor housing 204. In some embodiments, the processor 210 may be configured to implement signal processing or enhancement features to improve the display characteristics or data or images and/or to collect or process additional data, such as time, GPS information, waypoint designations, etc. and/or to filter extraneous data to better analyze the collected data. The processor 210 may further implement notices and alarms, such as those determined or adjusted by a user, to reflect depth, presence of fish, proximity of other watercraft, a person overboard event, etc.

The memory 214 may be configured to store instructions, computer program code, marine data, such as sonar data, chart data, location data, position/orientation sensor data, and other data associated with the trolling motor system 200 in a non-transitory computer readable medium for use by the processor 210.

The communication interface 208 may be configured to enable connection to external systems (e.g., an external network 228) and/or other systems, such as the user input assembly 206 and remote control 38. In this manner, the processor 210 may retrieve stored data from a remote, external server via the external network 228 in addition to or as an alternative to the onboard memory 214.

The position/orientation sensor 224 may be found in one or more of the main housing 202, the trolling motor housing 204 (see position/orientation sensor 224'), steering assembly 220, or remotely. In some embodiments, the position/orientation sensor 224 may be configured to determine a direction in which the trolling motor housing 204 is facing (e.g., compass heading). In some embodiments, the position/orientation sensor 224 may be operably coupled to either the shaft or steering assembly 220, such that the position/orientation sensor 224 measures the rotational change in position of the trolling motor housing 204 as the trolling motor is turned. The position/orientation sensor 224, 224' may be a magnetic sensor, a mechanical sensor, or the like.

The location sensor 222 may be configured to determine the current position and/or location of the main housing 202. For example, the location sensor 222 may comprise a GPS device, a bottom contour sounding device, an inertial navigation system, a ring laser gyroscope, or other location detection system.

The steering assembly 220 may include a motor or other mechanism configured to engage and rotate the shaft of the trolling motor assembly 14. For example, the motor may rotate to move a belt drive, gear drive, or the like, which rotates the shaft to cause the trolling motor housing 204 to be positioned to a desired direction of thrust.

The display 216 may be configured to display images and may include or otherwise be in communication with a user interface 218 configured to receive input from a user. The display 216 may be, for example, a conventional LCD display, an LED display, or the like. In some example embodiments, additional displays may also be included, such as a touch screen display, mobile device, or any other suitable display known in the art upon which images may be displayed. In any of the embodiments, the display 216 may be configured to display relevant trolling motor information including, but not limited to, speed data, motor data battery data, current operating mode, autopilot information, or the like.

The user interface 218 may include, for example, a keyboard, keypad, function keys, mouse, scrolling device, input/output ports, touch screen, or any other mechanism by which a user may interface with the trolling motor system 200.

The trolling motor housing 204 may include a trolling motor 230 for powering a propeller coupled thereto, a sonar transducer assembly 226, and one or more other sensors (e.g., position/orientation sensor 224', water temperature sensor, water current sensor, etc.), which may each be controlled by the processor 210.

The user input assembly 206 may be any device capable of receiving user input and controlling at least some operations of the trolling motor system 200. For example, the user input assembly 206 may be a foot pedal. Depending on the configuration of the trolling motor system 200, the user input assembly 206 may include a processor 210', memory 214', communication interface 208', and a deflection sensor 232. The processor 210', memory 214', communication interface 208', and user interface 218' may include features and functions such as described herein with respect to the corresponding module/system in the trolling motor assembly 14 (e.g., the processor 210, the memory 214, communication interface 208, and user interface 218). The deflection sensor 232 may be any device capable of sensing the position/deflection of a portion of the user input assembly 206, such as the foot pedal of the user input assembly 206. Such deflection may be used to control the rotation of the trolling motor shaft (e.g., the direction/orientation of the propeller).

The remote control 38 may be any device capable of receiving user input and controlling at least some operations of the trolling motor system 200 remotely. For example, the remote control 38 may be a wired or wireless remote control or a remote computing device, such as a dedicated marine electronics device or a personal computing device such as a phone or tablet. Although the remote control 38 is shown in FIG. 1 as being wireless/removable for purposes of carrying out some examples of the method of the present disclosure, it could be wired in other examples (e.g., when fobs are used to detect an overboard event as discussed herein below). Depending on the configuration of the trolling motor system 200, the remote control 38 may include a processor 210", memory 214", communication interface 208", display 216", user interface 218", and location sensor 222". The processor 210", memory 214", communication interface 208", display 216", user interface 218", and location sensor 222" may include features and functions such as described herein with respect to the corresponding module/system in the trolling motor assembly 14 (e.g., the processor 210, memory 214, display 216, communication interface 208, user interface 218, and location sensor 222) or the user input assembly 206 (e.g., the processor 210', memory 214', communication interface 208', and user interface 218').

By way of example, an operator can interact with the user interface 218" and/or display 216" to control the thrust of the trolling motor assembly 14. The remote control 38 may be provided with operator-selectable options to move forward, backward, turn left/right, and increase/decrease the speed of or stop the propeller. The remote control 38 may also be provided with options to enable one or more of the automatic navigation modes described herein. Inputs to the remote control 38 are communicated via communication interfaces 208" and 208 to the processor 210, which is configured to carry out the commands by controlling the steering assembly 220 and/or trolling motor 230.

The remote control 38 also includes an accelerometer 234 within its housing. The accelerometer 234 is a conventional three-axis accelerometer that can output electrical signals indicating the direction of movement and amount of movement of the accelerometer 234 with respect to the mutually perpendicular X-, Y-, and Z-axes. Such a three-axis accelerometer that outputs direction of movement and amount of movement is known in the art. The output of the accelerometer 234 can be an analog voltage or digital signal and can have a duty cycle output (ratio of pulse width to period) that is proportional to acceleration. The duty cycle output can be directly measured by the processor 210 to determine the noted amount of acceleration and direction of movement with respect to the X-, Y-, and Z-axes. The accelerometer 234 is attached to a printed circuit board within the remote control 38. The communication interface 208" is connected to the printed circuit board as well and electrically receives and communicates the outputs of the accelerometer 234 to the communication interface 208, which relays the outputs to the processor 210. In some examples, the accelerometer 234 is part of a six-axis MEMS motion sensor, which includes a three-axis accelerometer as well as a three-axis gyroscope that measures pitch, roll, and yaw of the remote control 38.

In some examples, any of the user interfaces 218, 218', 218" includes a plurality of user-selectable buttons, softkeys, or menu options that allow the trolling motor assembly 14 to operate in an automatic navigation mode. One user-selectable option may, for example, cause the trolling motor assembly 14 to maintain the marine vessel 10 at a given heading. Another user-selectable option may, for example, cause the trolling motor assembly 14 to maintain the marine vessel 10 at a given depth. Another user-selectable option may be an "electronic anchor," that causes the trolling motor to maintain the marine vessel 10 at a specific location (e.g., by maintaining GPS coordinates). Yet another user-selectable option may cause the marine vessel 10 to head to a waypoint or to traverse a route including a series of waypoints. The user-selectable options may actuate the processor 210 to automatically control the thrust produced by the trolling motor assembly 14 according to the selected option. According to some example embodiments, the processor 210 may be configured to determine a destination (e.g., via input by a user) and route for the marine vessel 10 and to control the steering assembly 220 to steer the trolling motor 230 in accordance with the route and destination. The memory 214 may store digitized charts and maps to assist with such autopilot navigation or the charts and maps may be accessed from the external network 228. To determine a destination and route for the marine vessel 10, the processor 210 may employ the location sensor 222 and/or the position/orientation sensor 224. Based on the route, the processor 210 may determine that different rates of turn may be needed to efficiently move along the route to the destination. In other examples, the processor 210 may use information from the sonar transducer assembly 226 and/or one or more maps or charts stored in the memory 214 or accessible from the external network 228 to actuate the steering assembly 220 to steer the trolling motor 230 such that the marine vessel 10 follows a path that maintains the marine vessel 10 at a given water depth.

Figure 3:
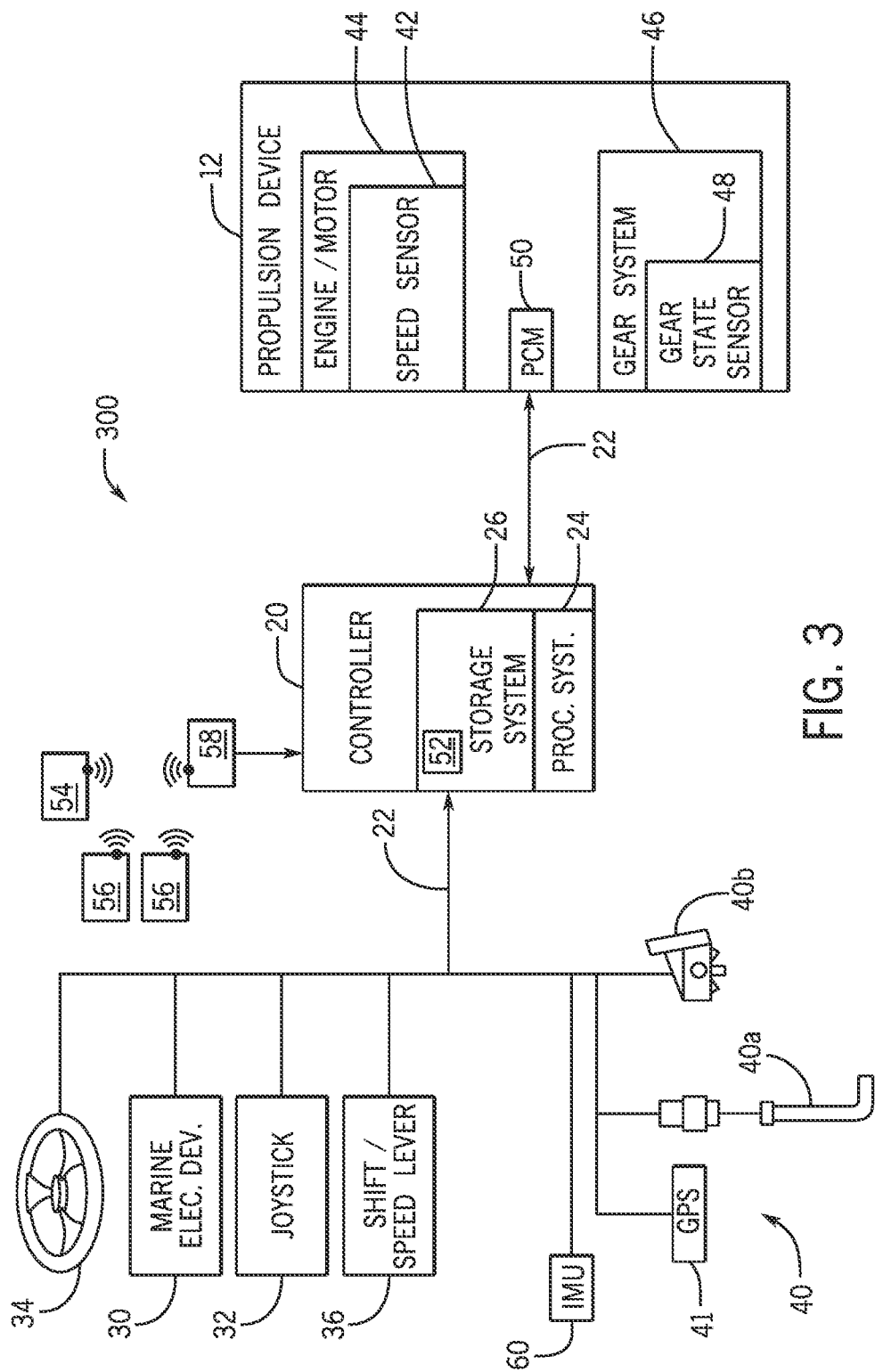
FIG. 3 is a schematic illustrating a portion of the marine propulsion system comprising an outboard motor.

FIG. 3 illustrates the portion of the marine propulsion system 16 related to the primary propulsion device 12, i.e. the primary propulsion system 300. The steering wheel 34, marine electronic device 30, joystick 32, and shift/speed lever 36 were described hereinabove and are in signal communication with the controller 20, which includes the above-noted processing system 24 and storage system 26. The controller 20 may also receive an input from one or more vessel speed sensors 40. The vessel speed sensor 40 may be, for example, a pitot tube sensor 40a, a paddle wheel type sensor 40b, or any other speed sensor appropriate for sensing the actual speed of the marine vessel 10. Alternatively or additionally, the vessel speed may be obtained by taking readings from a GPS device 41, which calculates speed by determining how far the marine vessel 10 has traveled in a given amount of time. Similarly, the controller 20 may receive input from a location sensor, such as GPS device 41, which continuously tracks and provides global position information describing the current location of the marine vessel 10. The propulsion device 12 is provided with an engine/motor speed sensor 42, such as but not limited to a tachometer, which determines a speed of the engine or motor 44 in rotations per minute (RPM). The engine/motor speed can be used along with other measured or known values to approximate a vessel speed (i.e., to calculate a pseudo vessel speed). A gear system 46 and gear state sensor 48 can also be provided for the propulsion device 12. For example, the gear state sensor 48 may provide an output indicating whether the gear system 46 (which may take any of various forms known in the art, such as a dog clutch) is in a forward gear state, a neutral state, or a reverse gear state. In the example in which the prime mover is a motor, the gear state sensor can be a sensor that determines which direction the propeller shaft is moving, or an algorithm that determines the direction of current provided to the motor. In certain embodiments, the outputs of the gear state sensor 48 and/or the engine/motor speed sensor 42 may be provided directly to the controller 20. In other embodiments, the gear state and engine/motor speed information may be provided to an intermediary control device, such as an propulsion control module (PCM) 50, which may then make such information available to the controller 20.

Similar to the trolling motor system 200 of FIG. 2, the primary propulsion system 300 is also operable in one or more automatic navigation modes. For example, the controller 20 can be enabled in an auto-heading or a waypoint tracking mode, as disclosed in U.S. Pat. No. 9,377,780 or U.S. Pat. No. 10,198,005, hereby incorporated by reference herein. In the auto-heading mode, the marine vessel 10 is maintained at a predetermined heading. To initiate auto-heading, for example, the operator of the marine vessel 10 could select a numerical heading from a keypad or a touch screen (found for example, on marine electronic device 30) and select the auto-heading feature, for example via the same keypad or touchscreen. Alternatively, the operator could manipulate the steering wheel 34 or joystick 32 until the marine vessel 10 is oriented to a desired heading, and then select the auto-heading feature. The controller 20 would then maintain the marine vessel 10 at this commanded heading for an extended period of time with little or no operator input required. For example, if wind, waves, or the like push the marine vessel 10 off course, the controller 20 would determine the corrective action needed to return the marine vessel 10 to the commanded heading, and provide steering and thrust commands to the propulsion device 12 so as to correct the direction of the marine vessel 10 such that it thereafter continues at the commanded heading.

In the waypoint tracking mode, the marine vessel 10 is automatically guided to a point (e.g., a global position defined in terms of latitude and longitude) or several points along a track. To initiate waypoint tracking mode, for example, the operator of the marine vessel 10 may select a point or track from a chart plotter (one example of the marine electronic device 30) and thereafter select waypoint tracking mode, for example via a keypad or touchscreen. The controller 20 then obtains a commanded heading from the autopilot control module (which is programmable code stored in the storage system 26 and executed by the processing system 24) according to the information provided by the chart plotter. The controller 20 then automatically guides the marine vessel 10 to each point along the track (or to the single selected point) by providing steering and thrust commands to the propulsion device 12. If the marine vessel 10 veers off course, such as due to the effect of wind, waves, or the like, the controller 20 determines the corrective action needed to resume the commanded heading so as to guide the marine vessel 10 back to the desired point and/or track. The controller 20 provides steering and/or thrust commands to the propulsion device 12 to achieve such corrective action.

In some examples, the controller 20 is configured to use both the trolling motor assembly 14 and the primary propulsion device 12 to carry out the automatic navigation modes, as described in U.S. Pat. No. 9,988,134.

In both the auto-heading and waypoint tracking modes, the controller 20 uses a heading feedback signal (indicating an estimate of the heading at which the marine vessel 10 is actually being propelled) to determine whether correction needs to be made to the actual heading of the marine vessel 10 in order to maintain the commanded heading. The controller 20 uses the heading feedback signal to determine how and to what extent the propulsion device 12 must be steered (and/or with what thrust) in order to re-orient the marine vessel 10 to the commanded heading. Automatic correction of the heading of the marine vessel 10 can be achieved according to the principles described in U.S. Pat. Nos. 7,267,068 and 7,305,928, the disclosures of which are hereby incorporated by reference in their entireties. The heading feedback signal can be provided by a compass or an inertial measurement unit (IMU) 60 provided in signal communication with the controller 20.

A person overboard detection control module 52 is a set of software instructions executable on a processor and configured to determine whether an individual may have fallen overboard and to generate commands in response to such a determination. The controller 20 stores and executes the person overboard detection control module 52, including executing logic to determine whether an individual may have fallen overboard and providing control instructions to the primary propulsion device 12 and/or trolling motor assembly 14 accordingly. In the depicted embodiment, the person overboard detection control module 52 is stored on the storage system 26 and executable on the processing system 24 of the controller 20. In the depicted embodiment, the controller 20 communicates with PCM 50 of the propulsion device 12. Although not shown herein, the controller 20 may also communicate with the controller 213 of the trolling motor assembly 14. Thereby, the controller 20 can instruct the PCM 50 and/or trolling motor controller 213 in order to effectuate certain control actions, for example, changing the engine/motor speed and/or gear state of the propulsion device 12 and/or 14 in response to detecting that an individual may have fallen overboard.

In order to determine if an individual may have fallen overboard, each individual can be provided with a portable device to be worn on or carried by that individual. The portable devices can include an operator fob 54 and one or more passenger fobs 56. According to the present disclosure, in examples in which fobs are used, at least the operator is provided with the operator fob 54, for reasons described herein below. The fobs 54, 56 are in wireless communication with a communication interface 58 that is in communication with the controller 20. The communication interface 58 can be a separate transceiver or receiver that communicates with the controller 20 or can be a transceiver or receiver built into a housing of the controller 20. The communication interface 58 can be part of or separate from the I/O interface 28 shown in FIG. 1. The wireless fobs 54, 56 may be battery-driven, such as containing replaceable or rechargeable batteries. The communication interface 58 and wireless fobs 54, 56 may communicate by any of various wireless protocols. In certain embodiments, the communication interface 58 and wireless fobs 54, 56 may be RFID devices. In one embodiment, the wireless fobs 54, 56 may contain passive or active RFID tags, and the communication interface may be an active or passive reader, which operate by any of various wireless standards, including but not limited to Bluetooth, Zigbee, or 802.11 WLAN. The fobs 54, 56 can each be provided with a three-axis accelerometer or a six-axis MEMS motion sensor, which function in the manner noted herein above with respect to accelerometer 234 in remote control 38, thereby providing the controller 20 with information related to accelerations of the respective fobs 54, 56 about the X-, Y-, and Z-axes. In some instances, the fobs 54, 56 may be provided with GPS devices as well.

Returning to FIG. 2, the trolling motor system 200 may also be configured to determine if a person has fallen overboard. For example, the memory 214 may store a person overboard detection control module 52', which is a set of software instructions executable on a processor and configured to determine whether an individual may have fallen overboard and to generate commands in response to such a determination. In the depicted embodiment, the person overboard detection control module 52' is stored in the memory 214 and executable on the processor 210, which together constitute at least part of the controller 213. In the depicted embodiment, the controller 213 commands the trolling motor 230 and the steering assembly 220 of the trolling motor assembly 14. Thereby, the controller 213 can instruct the trolling motor 230 and the steering assembly 220 in order to effectuate certain control actions, for example, changing the motor speed and/or direction and/or steering angle in response to detecting that an individual may have fallen overboard. Similar to the embodiment of FIG. 3, in one example, the communication interface 208" of the remote control 38 may be or comprise a passive or active RFID tag, and the communication interface 208 of the trolling motor assembly 14 may be or comprise an active or passive reader, which operate by any of various wireless standards as noted hereinabove.

Those having ordinary skill in the art will understand that the remote control 38 for the trolling motor system 200 is typically carried by the operator as the operator moves around the marine vessel 10. Sometimes, the remote control 38 may be provided with a lanyard that the operator can wear around the operator's neck while the remote control 38 is not in use, such as after the operator has enabled one of the above-noted automatic navigation modes. Further, one having ordinary skill in the art is also familiar with the types of fobs 54, 56 that an individual (whether an operator or passenger) can be provided with, such as a device on a lanyard to be worn about the neck, a device with a strap to be worn about the wrist or ankle, a device to be clipped onto the individual's clothes or life jacket, or any other device that can be held or worn by the individual. In this regard, the remote control 38 and the fobs 54, 56 (and the fob 408 and clip 414 described herein below with respect to FIG. 4) constitute portable devices for purposes of the present disclosure. Further, one having ordinary skill in the art will appreciate that although the primary propulsion system 300 is shown as being in communication with the fobs 54, 56, the trolling motor system 200 could also be in communication with the same fobs 54, 56 or dedicated fobs, such that the trolling motor assembly's communication interface 208 is configured for signal communication with any non-remote-control operator or passenger portable devices on the marine vessel 10. Further, it is possible that the primary propulsion system 300 could be provided with a portable device that is also a remote control device, such as a joystick or keypad that is movable about the marine vessel 10 and communicates with the controller 20 to command the propulsion device 12 to produce thrust, likely at low speeds only.

Thus, the present disclosure is of a system 200, 300 for a marine vessel 10 propelled by a propulsion device 12, 14, the system 200, 300 including a controller 20, 213 operable in an automatic navigation mode in which the controller 20, 213 automatically controls a thrust of the propulsion device 12, 14 to propel the marine vessel 10 through a body of water. As noted hereinabove, the automatic propulsion mode can be a waypoint tracking mode, an auto-heading mode, a depth tracking mode, a head-to-waypoint mode, or any other mode in which the marine vessel 10 is automatically propelled without operator intervention other than initial selection of such a mode. The system 200, 300 also includes a portable device 38, 54, 56 configured to be carried on an individual on the marine vessel 10, such as carried by or worn by the individual as described hereinabove. In one example, the portable device is a fob 54, 56 that is not provided with remote control functionality. In another example, the portable device is a remote control 38 configured to allow the individual to control the thrust of the propulsion device.

According to the present disclosure, the controller 20, 213 enables a person overboard detection algorithm in response to enablement of an automatic navigation mode. The person overboard detection algorithm is stored in the person overboard detection control modules 52, 52' described hereinabove. For example, in response to receiving an input command via the remote control 38, the user input assembly 206, or the user interface 218 that enables one of the automatic navigation modes, the trolling motor controller 213 will set a flag to enable the person overboard detection algorithm. Similarly, in response to receiving an input command via the marine electronic device 30, the joystick 32, or other remote control device that enables one of the automatic navigation modes, the primary propulsion device's controller 20 will set a flag to enable the person overboard detection algorithm. The flag in both instances remains set until the automatic navigation mode is canceled or otherwise disabled. Note that the flag may be set in response to a mere input to operate in the automatic navigation mode, or may be set in response to the controller 20, 213 actually beginning to operate the propulsion device 12, 14 in the automatic navigation mode. In the latter instance, there may be times when a user input does not result in enablement of the automatic navigation mode, such as for example if the marine vessel 10 is travelling too fast as determined by the speed sensor 40 or there is no signal from the GPS device 41 or location sensor 222.

According to the present disclosure, and as will be described further below, the person overboard detection algorithm disables the automatic navigation mode in response to detecting a given status of the portable device 38, 54, 56. The present inventors have realized, through research and development, that automatically disabling the previously enabled automatic navigation mode in the event of an individual falling overboard is desirable because it prevents the marine vessel 10 from traveling too far away from where the individual went overboard. Other known person-overboard algorithms are intended to take into account vessel speed such as in order to prevent the marine vessel from jerking to a stop in response to a person falling overboard. However, typically, when a marine vessel is operating in an automatic navigation mode, especially when under the thrust of the trolling motor assembly 14 only, the marine vessel 10 is not traveling fast enough that promptly disabling the automatic navigation mode will cause such a drastic reduction in speed. Thus, the present inventors have also developed a system and method that allow for more prompt detection of a person overboard event, such that the automatic navigation mode can be disabled as soon as possible, thereby increasing the likelihood that the marine vessel 10 will not have traveled far from the overboard person in the meanwhile.

The given status of the portable device generally relates to the distance of the portable device 38, 54, 56 from the controller 20, 213 with which it is in communication. For example, this distance can be measured by signal strength or by comparison of GPS locations. In another example, the distance of the portable device 38, 54, 56 from the controller 20, 213 is related to whether the portable device 38, 54, 56 remains physically connected to a switch in signal communication with the controller 20, 213. Each of these examples will be described hereinbelow.

In one example, the system 200, 300 includes a receiver (e.g., one example of the communication interface 58, 208) in signal communication with the controller 20, 213. In one example, the receiver may be a transceiver. In one particular example, the receiver may be an active or passive RFID reader. In such an example, the portable device 38, 54, 56 comprises a transmitter (e.g., one example of the communication interface 208"). In one example, the transmitter is a transceiver. In one particular example, the transmitter is an active or passive RFID tag. In such an example, the given status of the portable device 38, 54, 56 relates to a signal strength of the transmitter (i.e., RFID tag) as received by the receiver (e.g., RFID reader). For simplicity's sake, the portable device 38, 54, 56 will hereinafter be referred to as the transmitter and the communication interface 58, 208 will hereinafter be referred to as the receiver when referring to signal strength. Signal strength is the power level being received by the receiver from the transmitter and is determined by the transmission power, the distance between the transmitter and the receiver, and the intermediary environment. Those having ordinary skill in the art are familiar with a received signal strength indicator (RSSI) on wireless devices and how it provides an indication of received signal strength (RSS). The RSS can be used directly to determine whether an individual holding or wearing the portable device 38, 54, 56 may have fallen overboard. For example, knowing the maximum distance from the receiver to the edges of the marine vessel 10 can allow one to determine the approximate RSS at the receiver were the transmitter to be anywhere on the marine vessel 10. An RSS below this threshold may indicate that the transmitter has fallen overboard. Further, the user may be guided through a calibration/setup procedure, wherein the user stands at various locations on the marine vessel 10 and allows the receiver to measure the signal strength of the transmitter at each of those locations. The lowest signal strength can be set as the threshold below which a transmitter is deemed to have fallen overboard.

Not only can the RSS itself be used to determine if the transmitter (and thus likely the individual holding or wearing it) has fallen overboard, but also the change in RSS over time can be used for the same purposes. In one example, the person overboard detection algorithm disables the automatic navigation mode in response to detecting an abrupt change in the received signal strength of the transmitter. Such an abrupt change (calculated as a derivative of the RSS), if above a given threshold, may allow for detection of a person overboard event more promptly than simply using the RSS. For example, if the derivative of the RSS is above a threshold, it is unlikely a person has jumped from one spot on the marine vessel 10 to another, and more likely that they have fallen overboard. The abrupt change in RSS may be due not only to the person falling overboard and the marine vessel 10 continuing to move away from them under automatic control, but may also be due to the transmitter temporarily being underwater as the person is first submerged or due to the signal from the transmitter reflecting, refracting, or diffracting differently due to the hull now being at least partially between the transmitter and the receiver. Thus, smaller changes in RSS are able to be detected and used to determine if a person has fallen overboard, allowing for more prompt subsequent action.

In some examples, GPS position is used to determine if the portable device 38, 54, 56 is far enough from the marine vessel 10 that a person holding or wearing the portable device 38, 54, 56 has likely fallen overboard. For example, the controller 20 or 213 can compare the GPS position of the portable device 38 or 54, 56 to the GPS position of the GPS device 41 or the location sensor 222. If the GPS positions are greater than a given threshold distance from one another, the controller 20 or 213 determines that a person has likely fallen overboard. However, because GPS is typically accurate to within a couple meters, this method may work better on larger marine vessels and may not be as prompt at detecting a person overboard event as the method of using RSS or the derivative of RSS.

In either the instance of using RSS or its derivative or in the instance of using GPS position to determine if a person may have fallen overboard, the acceleration of the portable device 38, 54, 56 may also be used to provide information related to the given status of the portable device 38, 54, 56. As noted hereinabove, the portable device 38, 54, 56 may also include an accelerometer (e.g., accelerometer 234) and the person overboard detection algorithm disables the automatic navigation mode in response to an abrupt change in acceleration of the portable device 38, 54, 56 as determined by the accelerometer. It may be empirically determined what pattern of lateral and/or vertical movement precedes a person falling overboard, and the controller 20, 213 may compare this empirical data to a signal from the accelerometer to determine whether it is likely a person has fallen overboard, or whether instead they have simply dropped their portable device 38, 54, 56 on the marine vessel 10 or into the water. Further, instead of being used as a secondary source of information, in addition to the RSS or GPS position, accelerometer data alone can be used as the criteria to determine whether it is likely a person has fallen overboard.

In some examples, RSS or its derivative alone is used to determine if a person has fallen overboard. In other examples, comparison of the GPS position of the portable device with the GPS position of the marine vessel alone is used to determine if a person has fallen overboard. In other examples, accelerometer data alone can be used to determine if a person has fallen overboard. Further, any combination of two of the above-noted sources of information or all three sources of information can be used to determine if a person has fallen overboard.

Further, in some examples, the controller 213 is configured to disable the automatic navigation mode in response to information from only the operator fob 54 or the remote control 38, but not in response to information from a passenger fob 56. This prevents the marine vessel from automatically navigating away from the operator if the operator is the person who fell overboard. As long as the operator remains on the marine vessel, they are able to cancel the automatic navigation mode if necessary in response to a passenger leaving the marine vessel. For example, it may be that a passenger purposefully jumped off the marine vessel and simply forgot to remove their fob, and under such circumstances, it may not be necessary to discontinue the automatic navigation mode.

In one example, besides disabling the automatic navigation mode in response to detecting the given status of the portable device 38, 54, 56, the person overboard detection algorithm controls the propulsion device 12, 14 to stop producing thrust in response to detecting the given status of the portable device 38, 54, 56. For example, the controller 213 may stop the trolling motor 230, or the controller 20 may place the gear system 46 in neutral. This not only lessens the likelihood that the marine vessel 10 will travel further from the person than it already has, but also allows the overboard person to approach the marine vessel 10 without fear of contact with a spinning propulsor. In another example, if the location sensor 222 and/or position/orientation sensor 224 (or the GPS device 41 or IMU 60) indicate that the marine vessel 10 is drifting or being blown from the location where the automatic navigation mode was initially disabled, the controller 213 (or 20) can enable a spot-lock or station-keeping feature of the propulsion device 14 (or 12) in order to maintain the marine vessel 10 close to where the person likely went overboard.

In another example, the person overboard detection algorithm is configured to determine if the marine vessel 10 is within a given range of the person who fell overboard. This may be done by comparing a location of the portable device 38, 54, 56 as determined by a location sensor therein (e.g., location sensor 222' in remote control 38) with a location of the marine vessel 10 as determined by a location sensor thereupon (e.g. GPS device 41 or location sensor 222). This may additionally or alternatively be done by determining whether the communication interface (e.g., RFID chip or RF transceiver) of the portable device 38, 54, 56 is within signal range of the communication interface 58, 208 on the marine vessel 10. If the marine vessel 10 is not within range of the person who fell overboard, the person overboard detection algorithm controls the propulsion device 12, 14 to cause the marine vessel 10 to backtrack along an immediately prior course of the marine vessel 10 in response to detecting the given status of the portable device. For example, if the marine vessel 10 had been in waypoint tracking mode, the controller 20 or 213 commands the propulsion device 12 or 14 to propel the marine vessel 10 back to the immediately prior waypoint. If the marine vessel 10 had been in auto-heading mode, the controller 20 or 213 commands the propulsion device 12 or 14 to begin heading in the opposite compass heading. In another example, instead of backtracking exactly along the prior course, the controller 20 or 213 is configured to backtrack to the position of the overboard person, as determined by the GPS position of the portable device 38, 54, 56 and/or by sonar or other proximity sensor data. The controller 20, 213 can set the location of the person as a point of interest and can cause the marine vessel 10 to circle that point at a predetermined radius. In any of the above examples of backtracking, the controller 20, 213 may be configured to guide the marine vessel 10 to a standoff distance from the overboard person and to electronically anchor there. In other examples, the controller 20, 213 can take into account any current in the water, as determined by a current sensor, and can navigate downstream of where the person went overboard, as they have likely drifted downstream.

It may be that while the marine vessel 10 is backtracking along its immediately prior course, or in the event the operator is manually directing the marine vessel 10 back to the person who fell overboard, that it would be desirable to reduce the speed of the marine vessel 10 as it nears the overboard person. This can prevent overshoot of the person as well as make them feel more confident the marine vessel 10 will not contact them. Thus, in some examples, the person overboard detection algorithm controls the propulsion device 12 or 14 to reduce the thrust thereof in response to determining that the marine vessel 10 is within a given range of the portable device 38, 54, 56 subsequent to having been outside the given range of the portable device 38, 54, 56. Again, whether the portable device 38, 54, 56 is within or out of range of the marine vessel 10 can be determined by GPS position, RSS, or the derivative of RSS as noted hereinabove. In another example, a proximity sensor, such as the sonar transducer assembly 226 on the trolling motor housing 204, can provide information to the controller 20 or 213 that indicates the person is within range.

Figure 4:
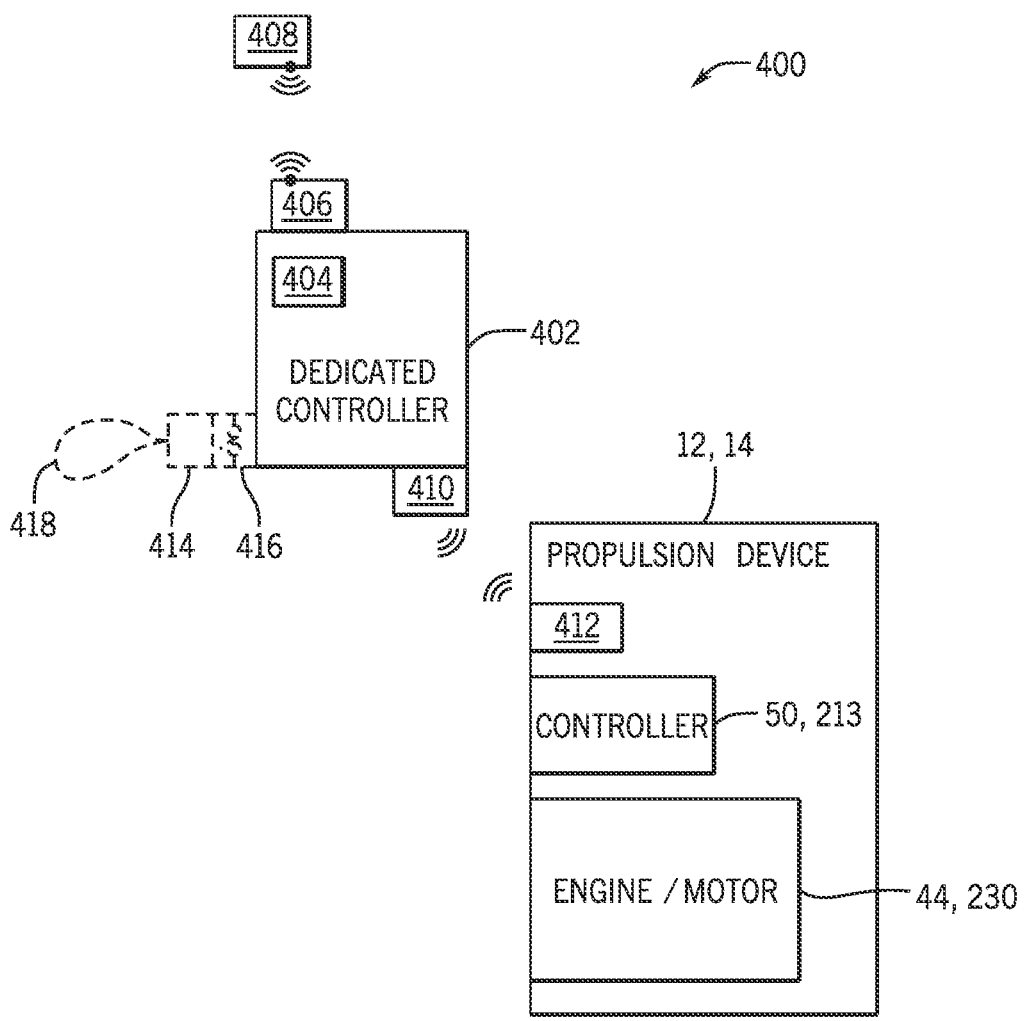
FIG. 4 is a schematic illustrating another embodiment of the marine propulsion system comprising a trolling motor or an outboard motor.

FIG. 4 illustrates another system 400 for detecting a given status of a portable device (such as fob 408) to determine if a person may have fallen overboard such that the automatic navigation mode should be disabled. In this example, the person overboard detection algorithm may be carried out by a dedicated controller 402. In the depicted embodiment, the person overboard detection module 404 receives input from the communication interface 406 to determine whether to disable the automatic navigation mode. For example, if the fob 408 is no longer detected within range of the communication interface 406, then the controller 402 may be controlled to disable the automatic navigation mode and to cause the propulsion device 12, 14 to stop producing thrust or to propel the marine vessel 10 such that it backtracks along its immediately prior course. The controller 402 does this by communicating via a communication interface 410 with a communication interface 412 of the propulsion device 12, 14. In one example, the communication is wireless, as shown here, and can be radio frequency communication. In another example, the communication is wired, such as if the controller 402 is plugged into the CAN bus on the marine vessel 10 to which the propulsion device 12, 14 is also connected. The communication interface 412 communicates information from the controller 402 to the controller of the propulsion device 12, 14, which may be its own internal controller 50 or 213, respectively. The controller 50 or 213 then controls the engine or motor 44, 230 according to the instructions stored in the person overboard detection module 404. The person overboard detection module 404 operates in the same or similar way to the person overboard detection control module 52, 52' described hereinabove, as do the other components described sharing the same name (i.e., the communication interfaces 406, 410 can be similar to communication interfaces 58, 208; the fob 408 can be similar to the fobs 54, 56; etc.)

FIG. 4 shows an alternative option in phantom in which the portable device is a clip 414 that is physically connected to the controller 402. More specifically, the clip 414 is directly connected to a switch 416 in signal communication with the controller 402. In this example, the switch 416 is directly electrically connected to the controller 402, such that removal of the clip 414 from the switch 416 is directly detected by the controller 402 by the opening or closing of an electrical circuit. In this way, the clip 414 and switch 416 act like a safety lanyard that traditionally has been used to cut power to the propulsion device 12, 14 when the clip 414 is removed from the switch 416 due to the wearer moving too far from the switch 416 and pulling on the lanyard 418 attached to the clip 414. In this example, also, the person overboard detection algorithm stored on the person overboard detection module 404 disables the automatic navigation mode in response to detecting a given status of the portable device (e.g., clip 414). Specifically, the given status of the portable device is that the portable device is not physically connected to a switch 416 in signal communication with the controller 402.

In one example, the switch 416 is movable onboard the marine vessel 10 while still maintaining signal communication with the controller 402. In one particular example, the entire controller 402 and switch 416 connected thereto are movable about the marine vessel 10. In one example, the controller 402 is located in a housing that slides on a rail extending fore and aft along the side of the marine vessel 10. In another example, the controller 402 is in a housing that is free to move anywhere on the marine vessel 10. A movable controller may allow the user to move about the marine vessel 10 while also using the physically connected lanyard 418 and clip 414. It may also allow the user to move the location of the receiver (i.e., communication interface 406) at which signal strength is determined in the event that the wireless fob 408 is used. If so configured, the controller 402 may communicate wirelessly with the propulsion device 12, 14 as long as within range. Alternatively, the controller 402 can be plugged into the CAN backbone at one or more access points on the marine vessel 10, which eliminates the need for a separate battery for the controller 402. Note that the concept of having a lanyard 418 and clip 414 that are physically connected to a switch in signal communication with a controller may also be implemented with a non-dedicated controller, such as the controller 20 (or PCM 50) or trolling motor controller 213. However, the ability to move a dedicated controller 402 about the marine vessel 10 may be particularly helpful for a system and method that are intended to apply person overboard detection algorithms to operation of a marine propulsion system 200, 300, 400 in an automatic navigation mode, during which the operator may wish to leave the immediate vicinity of the propulsion device 12, 14.

Figure 5:
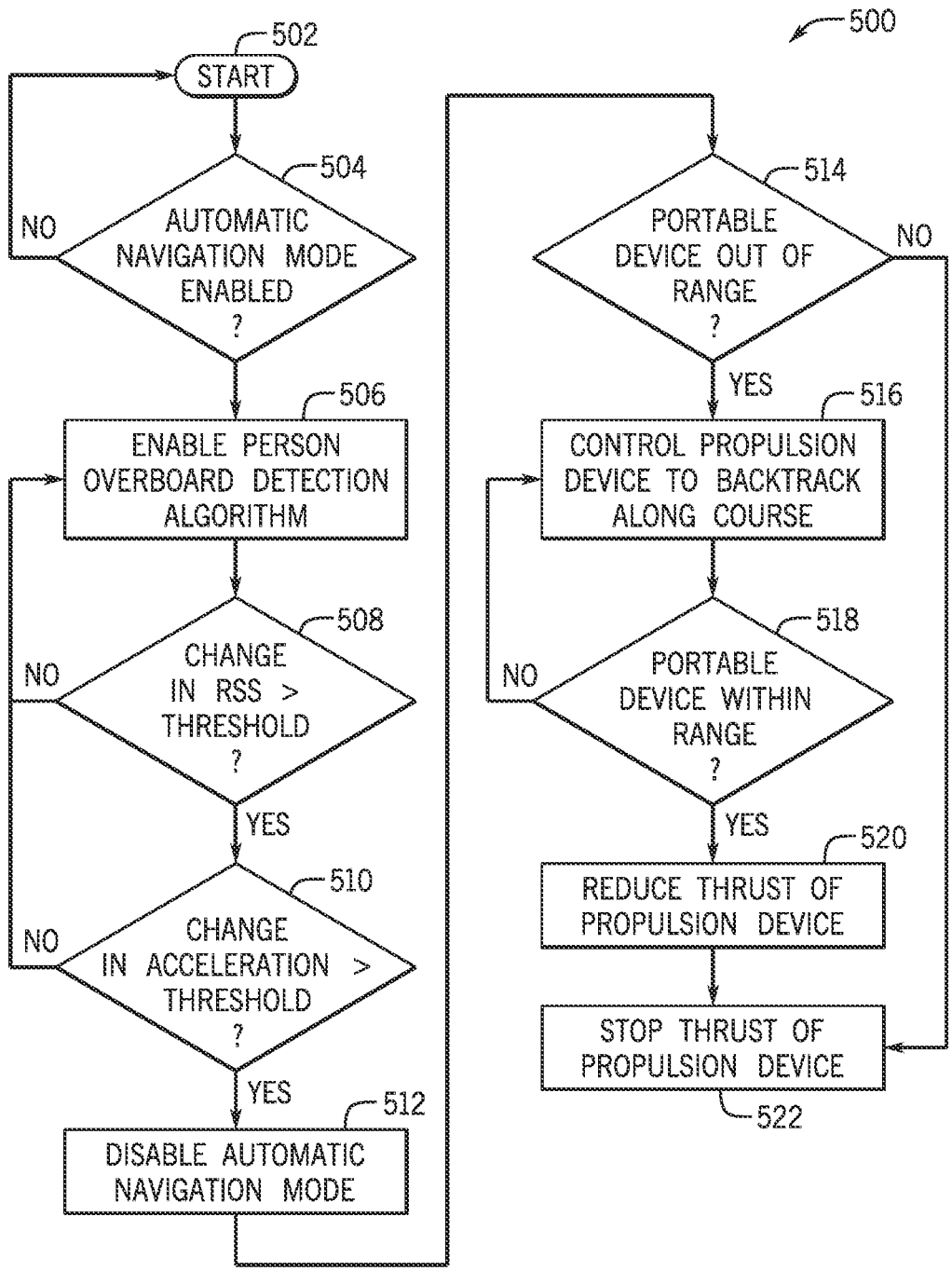
FIG. 5 illustrates a method for controlling a propulsion device on a marine vessel according to the present disclosure.

FIG. 5 illustrates a method for controlling a propulsion device 12, 14 on a marine vessel 10. The method begins at 502 and comprises enabling an automatic navigation mode in which a thrust of the propulsion device 12, 14 is controlled automatically to propel the marine vessel 10 through a body of water. In response to enablement of the automatic navigation mode ("yes" at 504) the method includes enabling a person overboard detection algorithm, as shown at 506. The method 500 includes disabling the automatic navigation mode in response to the person overboard detection algorithm determining that an individual on the marine vessel 10 may have fallen overboard, as shown at 512. Determining that the individual on the marine vessel 10 may have fallen overboard includes detecting a given status of a portable device 38, 54, 56, 408, 414 configured to be carried on the individual and in signal communication with a controller 20, 213, 402 of the propulsion device 12, 14.

In some particular examples, the portable device 38, 54, 56, 408 comprises a transmitter and the given status of the portable device 38, 54, 56, 408 relates to a signal strength of the transmitter as received by a receiver in signal communication with the controller 20, 213, 402. For example, the method includes disabling the automatic navigation mode in response to detecting an abrupt change in the received signal strength of the transmitter (i.e., the change in signal strength is greater than a threshold, as shown at 508). The method 500 may further include disabling the automatic navigation mode in response to an abrupt change in acceleration of the portable device 38, 54, 56, 408 as determined by an accelerometer in the portable device (i.e., the change in acceleration is greater than a threshold, as shown at 510). In the example depicted here, the change in signal strength must be greater than a predetermined threshold before the change in acceleration of the portable device is taken into account. Further, the change in acceleration of the portable device must also be greater than a given threshold before the automatic navigation mode will be disabled at 512. However, in other examples, the change in acceleration may be a first determination and the change in signal strength may be a second determination. In still other examples, only the change in signal strength or the change in acceleration is taken into account to determine whether to disable the automatic navigation mode. In still other examples, other information is taken into account to determine if the person went overboard, such as if the portable device 38, 54, 56, 408, 414 is provided with a water sensor, and the fact that the personal device is submerged in water can be communicated to the controller 20, 213, 402. In one example, if certain information is available that suggests a person may have fallen overboard, but not all required information, the portable device or the controller can be configured to emit an alert, such as a sound or vibration. For example, if the accelerometer in the portable device indicates that a pattern similar to one known to represent an overboard event has been sensed, but the RSS has not changed, the portable device may emit a beep to let the user know that whatever action they are engaging in could result in falsely triggering the person overboard routine.

In other examples, different determinations may be made between steps 506 and 512. For example, the given status of the portable device may be that the portable device (e.g., clip 414) is not physically connected to a switch 416 in signal communication with the controller 402. In such an example, the switch 416 may be movable onboard the marine vessel 10 while still maintaining signal communication with the controller 402.

After step 512, a determination is made at 514 as to whether the portable device 38, 54, 56, 408 is out of a predetermined range, as determined by lack of an RF signal, weak signal strength, or GPS position. If "yes" at 514, the method 500 includes controlling the propulsion device 12, 14 to cause the marine vessel 10 to backtrack along an immediately prior course of the marine vessel 10, as shown at 516, in response to determining that the individual on the marine vessel may 10 have fallen overboard (as previously determined at 508 and/or 510). Further, in response to determining at 518 that the marine vessel 10 is within the given range of the individual subsequent to having been outside the given range of the individual (as previously determined at 514), the method includes reducing the thrust of the propulsion device 12, 14, as shown at 520.

If "no" at 514 (i.e., the portable device is within the predetermined range), or after the thrust of the propulsion device has been reduced at 520, the method 500 includes discontinuing thrust production by the propulsion device, as shown at 522, in response to determining that the individual on the marine vessel may have fallen overboard (as previously determined at 508 and/or 510). If 522 follows 520, the stopping of thrust production could be done at a predetermined time period after the thrust was reduced, in response to the portable device or individual being detected within an even closer predetermined range (as determined by RSS, GPS position, and/or proximity sensors), or in response to operator input. If 522 immediately follows 514, discontinuing thrust production may automatically follow a determination that the portable device is within range, or may be in response to operator input.

In each of the above examples, the person overboard detection module can be disabled manually, such as if a person would like the marine vessel 10 to operate in an automatic navigation mode, but to ignore any information that might signal a person overboard event. The user may use the marine electronic device 30 or user interface 218, 218', 218" to enter such a disabling command. The user may use the same device to re-enable the person overboard detection module, or the person overboard detection module may be automatically re-enabled after the automatic navigation mode is disabled and then re-enabled.

Typically, if a person is operating the primary propulsion device 12, they are not also operating the trolling motor assembly 14 at the same time, and vice versa. Thus, the controllers 20, 213 can be configured to recognize the same fob 54, 56, 408 or clip 414 for carrying out the person overboard detection algorithm in order to control the propulsion device 12 if it is running or in order to control the propulsion device 14 if it is running. In the event that both propulsion devices 12, 14 are running, a single person overboard event, whether it be triggered based on the status of the remote control 38, fobs 54, 56, 408, or clip 414, will result in action being taken with respect to both propulsion devices 12, 14.

In the above description, certain terms have been used for brevity, clarity, and understanding. No unnecessary limitations are to be inferred therefrom beyond the requirement of the prior art because such terms are used for descriptive purposes and are intended to be broadly construed. The order of method steps or decisions shown in the Figures and described herein are not limiting on the appended claims unless logic would dictate otherwise. It should be understood that the decisions and steps can be undertaken in any logical order and/or simultaneously. The different systems and methods described herein may be used alone or in combination with other systems and methods. It is to be expected that various equivalents, alternatives and modifications are possible within the scope of the appended claims.

What is claimed is:

1. A system for a marine vessel propelled by a propulsion device, the system comprising:
   a controller operable in an automatic navigation mode in which the controller automatically controls a thrust of the propulsion device to propel the marine vessel through a body of water; and
   a portable device configured to be carried on an individual on the marine vessel;
   wherein the controller enables a person overboard detection algorithm in response to enablement of the automatic navigation mode; and
   wherein the person overboard detection algorithm disables the automatic navigation mode in response to detecting a given status of the portable device.

2. The system of claim 1, further comprising a receiver in signal communication with the controller;
   wherein the portable device comprises a transmitter; and
   wherein the given status of the portable device relates to a signal strength of the transmitter as received by the receiver.

3. The system of claim 2, wherein the person overboard detection algorithm disables the automatic navigation mode in response to detecting an abrupt change in the received signal strength of the transmitter.

4. The system of claim 2, wherein the portable device further comprises an accelerometer; and
   wherein the person overboard detection algorithm disables the automatic navigation mode in response to an abrupt change in acceleration of the portable device as determined by the accelerometer.

5. The system of claim 1, wherein the given status of the portable device is that the portable device is not physically connected to a switch in signal communication with the controller.

6. The system of claim 5, wherein the switch is movable onboard the marine vessel while still maintaining signal communication with the controller.

7. The system of claim 1, wherein the person overboard detection algorithm controls the propulsion device to cause the marine vessel to backtrack along an immediately prior course of the marine vessel in response to detecting the given status of the portable device.

8. The system of claim 1, wherein the person overboard detection algorithm controls the propulsion device to reduce the thrust thereof in response to determining that the marine vessel is within a given range of the portable device subsequent to having been outside the given range of the portable device.

9. The system of claim 1, wherein the person overboard detection algorithm controls the propulsion device to stop producing thrust in response to detecting the given status of the portable device.

10. The system of claim 1, wherein the portable device is a remote control configured to allow the individual to control the thrust of the propulsion device.

11. A method for controlling a propulsion device on a marine vessel, the method comprising:
   enabling an automatic navigation mode in which a thrust of the propulsion device is controlled automatically to propel the marine vessel through a body of water;
   enabling a person overboard detection algorithm in response to enablement of the automatic navigation mode; and
   disabling the automatic navigation mode in response to the person overboard detection algorithm determining that an individual on the marine vessel may have fallen overboard.

12. The method of claim 11, wherein the step of determining that the individual on the marine vessel may have fallen overboard comprises detecting a given status of a portable device configured to be carried on the individual and in signal communication with a controller of the propulsion device.

13. The method of claim 12, wherein the given status of the portable device is that the portable device is not physically connected to a switch in signal communication with the controller.

14. The method of claim 13, wherein the switch is movable onboard the marine vessel while still maintaining signal communication with the controller.

15. The method of claim 12, wherein the portable device comprises a transmitter; and
   wherein the given status of the portable device relates to a signal strength of the transmitter as received by a receiver in signal communication with the controller.

16. The method of claim 15, further comprising disabling the automatic navigation mode in response to detecting an abrupt change in the received signal strength of the transmitter.

17. The method of claim 12, further comprising disabling the automatic navigation mode in response to an abrupt change in acceleration of the portable device as determined by an accelerometer in the portable device.

18. The method of claim 11, further comprising controlling the propulsion device to cause the marine vessel to backtrack along an immediately prior course of the marine vessel in response to determining that the individual on the marine vessel may have fallen overboard.

19. The method of claim 11, further comprising reducing the thrust of the propulsion device in response to determining that the marine vessel is within a given range of the individual subsequent to having been outside the given range of the individual.

20. The method of claim 11, further comprising discontinuing thrust production by the propulsion device in response to determining that the individual on the marine vessel may have fallen overboard.

* * * * *